Dec. 5, 1933.                    A. MEYER                    1,937,977
          DEVICE FOR DISPLACING FROM THE AXIS TO THE PIPE WALL
             THE HIGHEST SPEED IN TUBES BEING FLOWED THROUGH
                          Filed Sept. 5, 1930

Patented Dec. 5, 1933

1,937,977

UNITED STATES PATENT OFFICE 1,937,977

DEVICE FOR DISPLACING FROM THE AXIS TO THE PIPE WALL THE HIGHEST SPEED IN TUBES BEING FLOWED THROUGH

Arthur Meyer, Altona-Bahrenfeld, Germany

Application September 5, 1930, Serial No. 479,938, and in Germany August 19, 1930

2 Claims. (Cl. 137—112)

This invention relates to a wall arranged obliquely to the tube axis and having one or a plurality of apertures situated eccentrically to the tube axis, which wall is inserted in tubes, and displaces the highest speed of the medium flowing through the tubes, for example gases, vapors, liquids, impurities or other foreign bodies, from the tube axis to the tube wall without producing an eddy current.

A number of devices exist, which are intended for this purpose, but none of same attain their object with such simple means as those forming the subject matter of the invention. In many instances a turning of the flow around the tube axis is effected, however the highest through-flow speed always remains in the axis. In other instances detrimental stationary whirls occur, which cause considerable increases of the resistance.

As compared therewith, the present invention is based on the knowledge, that in tubes which are flowed through the speed is, as known, highest in the tube axis and lowest on the tube wall.

The object of the invention is, to displace the axial highest speed onto the wall of the tube like the tornadoes occurring in nature. The courses of the individual particles are helical lines, the greatest absolute speed of which is situated in the courses on the tube wall.

This displacement of the highest speed onto the tube wall has two important main results, namely a mechanical and a thermo-technical result.

Heavy foreign particles in suspension are naturally only carried along by a flowing medium, if the energy of the flowing medium is sufficiently great to convey the suspended particles. This energy depends however, in the case of smaller masses of gas, steam or liquids as compared with solid particles, in the first place upon the speed of the flowing medium, because, as is known, its power $$A = \frac{Mv^2}{2}$$

In the case of pipes axially flowed through, even the minutest particles therefore deposit on the walls because the speed there is practically or entirely equal to O and A is practically a minus quantity. If the highest speed is brought onto the tube walls, the power of the current in that portion will become a maximum value. Consequently the materials in suspension cannot deposit on the tube wall, so that the tubes remain clean. Substances in suspension also easily deposit preferably at those places, where so-called stationary whirls form, which differ from the vertical whirls, which pass along with the flow. The stationary whirls, as is known, form at places, where sudden narrowings or enlargings of cross section occur, or other hindrances effect sharp alterations in the direction of flow.

Such stationary whirls are prevented according to the application in that the deflection is effected gradually, offering the least resistance and preventing all changes of direction.

The keeping clean of the tubes by bringing the highest speed on the tube wall, preventing at the same time stationary whirls, constitutes the important advantage of the invention in a mechanical sense, which is shown directly by an improvement in the heat exchange. The thermo-technical advantages are due to the following:

1. The stagnant gas-steam- or liquid boundary layer on the tube wall, which, as is known, exerts an insulating effect, owing to the bad heat conductivity of these substances, is avoided.

2. The absolute speed and thereby also the heat exchange coefficient is increased. According to Nusselt the heat supply figure in the case of non-deflected axial through flowing is already increased solely by increasing the average speed.

A thermotechnical, so-called catalytic effect, which is extremely important, occurs, as is known, at the points, where the wall becomes incandescent and serves for igniting combustible gases.

In the case of fire tubes in which the device according to the invention must be arranged directly behind the fire bridge, this occurs, as the device becomes incandescent, and thus as heat accumulator at the same time exceeding the inflaming temperature of the combustible gases, causes unburned gases mixing with the excess air to ignite, and thus enables a smokeless combustion without too great excess of air.

Several embodiments of the invention are illustrated by way of example in the accompanying drawing in which.

Figure 1:
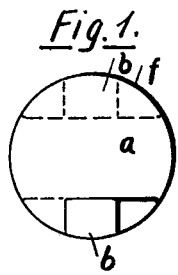
Fig. 1 shows a fire tube in end view.
Figure 2:
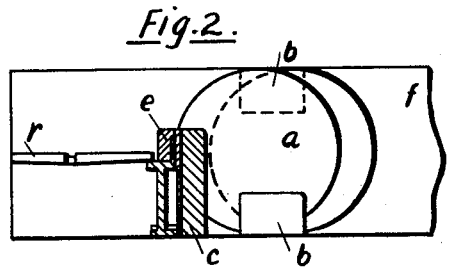
Fig. 2 is a longitudinal section of the tube with the device in position.
Figure 3:
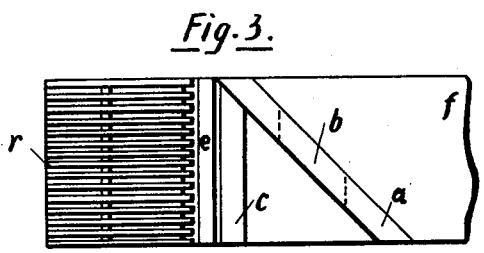
Fig. 3 is a horizontal section through the tube.

In Figs. 1 to 3 the device is shown by way of example, built in a fire tube. $f$ designates the fire tube, $r$ the grade and $e$ an ordinary fire bridge. $a$ is a wall arranged according to the invention obliquely to the longitudinal axis of the fire tube, which wall has an aperture $b$ at the bottom or an aperture $b'$ at the top. $c$ merely is a protecting wall in order to protect the fire bridge against burning. Behind the apertures $b$ or $b'$ whirl preventing unions or cavities may be arranged as usual.

The operation is as follows:

The gases from combustion flow over the fire bridge $e$ and the upper edge of the wall $c$ (see Fig. 2) in downward direction, are diverted through the opening $b$ transversely to the longitudinal axis of the fire tube $f$ and flow along the inner wall thereof, thus performing a circulating movement at this point. As however the draught, after passing the aperture $b$, tends to suck the gas flow in the direction of the longitudinal axis of the fire tube, both movements result in a helical movement, which continues to the end of the tube. The proceeding is analogous if the aperture $b'$ is situated at the top.

Figure 4:
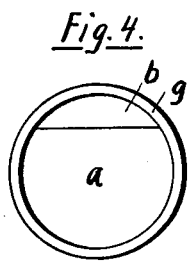
Fig. 4 shows a modified form of construction in cross section.
Figure 5:
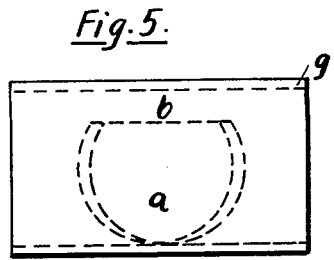
Fig. 5 is a vertical longitudinal section and Fig. 6 a horizontal section of Fig. 4.
Figure 6:
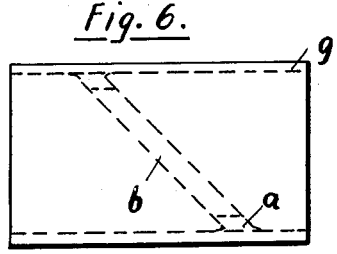

Figs. 4, 5 and 6 show a form of construction for any kind of tubes, for example superheater tubes, smoke tubes, boiler tubes, condenser tubes and the like, it being just as important to obtain the most effective exchange of heat, as to keep the bore and inner surfaces free from deposits. $g$ designates the tubes, $a$ the oblique wall and $b$ the aperture, which in this instance is formed by the inner wall of the tube $g$ and the portion cut off the oblique transverse wall at $b$.

The aperture in Figs. 1, 2 and 3 may evidently be obtained in the same manner. This form of construction can be inserted into existing tubes or fastened on some other mouth.

The oblique wall may be made in such a manner that the entire surface does not lie in one plane, but is broken or bent.

Besides the examples given, the invention may be carried out in any other manner, for example as regards the shape of the aperture, arrangement of the oblique wall and construction thereof, for example by pressing in the tube wall at an incline to the bore axis and the like, without departing from the scope of the invention.

I claim:—

1. A device for producing whirling flow of gases, vapors, liquid, foreign bodies and the like in tubes and the like, comprising in combination with the tube, an elliptic wall arranged obliquely to the longitudinal axis of the tube having an aperture laterally arranged to the longer axis of the elliptic wall and extending from the tube wall.

2. A form of construction of the device as specified in claim 1, comprising in combination with the tube and the oblique wall, an insert arranged in said tube and carrying said inclined wall.

ARTHUR MEYER.